F. W. ERICKSON.
SPRING SUSPENSION FOR VEHICLES.
APPLICATION FILED APR. 13, 1915.

1,151,771. Patented Aug. 31, 1915.

Inventor,
Frederic Wm Erickson
by Geo. Willis Pierce
Attorney.

UNITED STATES PATENT OFFICE.

FREDERIC WM. ERICKSON, OF ALBANY, NEW YORK.

SPRING SUSPENSION FOR VEHICLES.

1,151,771.  Specification of Letters Patent.  Patented Aug. 31, 1915.

Application filed April 13, 1915. Serial No. 21,179.

*To all whom it may concern:*

Be it known that I, FREDERIC WM. ERICKSON, residing at Albany, in the county of Albany and State of New York, have invented certain Improvements in Spring Suspension for Vehicles, of which the following is a specification.

The invention about to be described relates to spring suspension apparatus for vehicles, particularly to those of fast moving type, as automobiles, and is intended to add to comfort and economy in driving over hilly and rough roads.

The improved apparatus is arranged between the wheel axles and the chassis of automobiles in such manner that the weight carrying portion or the tonneau superimposed on the chassis will travel in a straight or level line comparatively, while the running gear in contacting with the ground will follow the contour of the road surface as closely as possible to prevent the tires from leaving the road surface.

The invention consists essentially in a novel arrangement of parts for spring suspension producing great elasticity and freedom from shocks, and consists in the employment of flat leaved springs inclosed in a sealed casing filled with oil having one end carried by a suitable fulcrum supported by the wheel axle while the opposite end exerts its own resiliency upon the chassis for common and usual disturbances and is combined with secondary resilient means to afford relief from sudden and severe shocks to the chassis.

Figure 1:
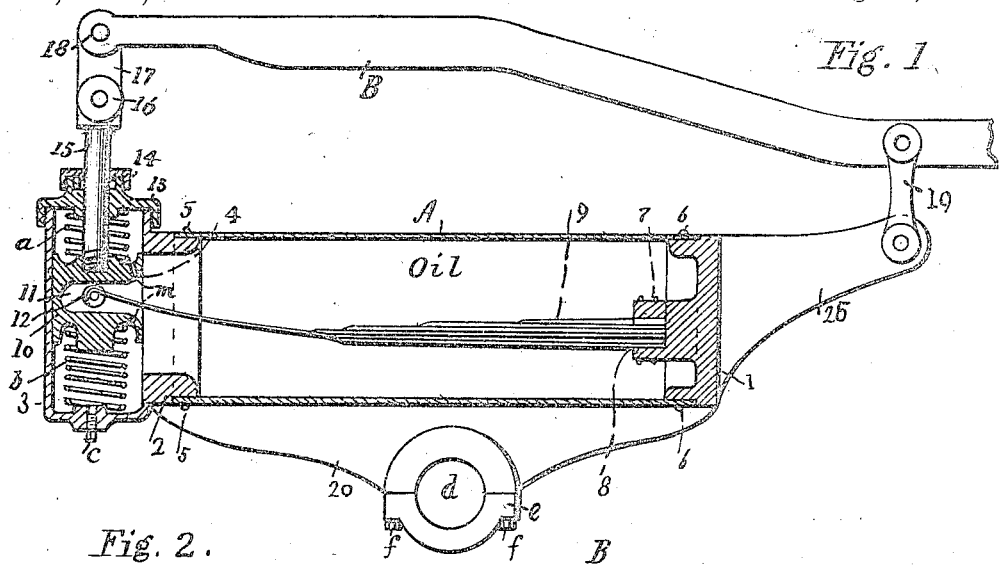
Figure 2:
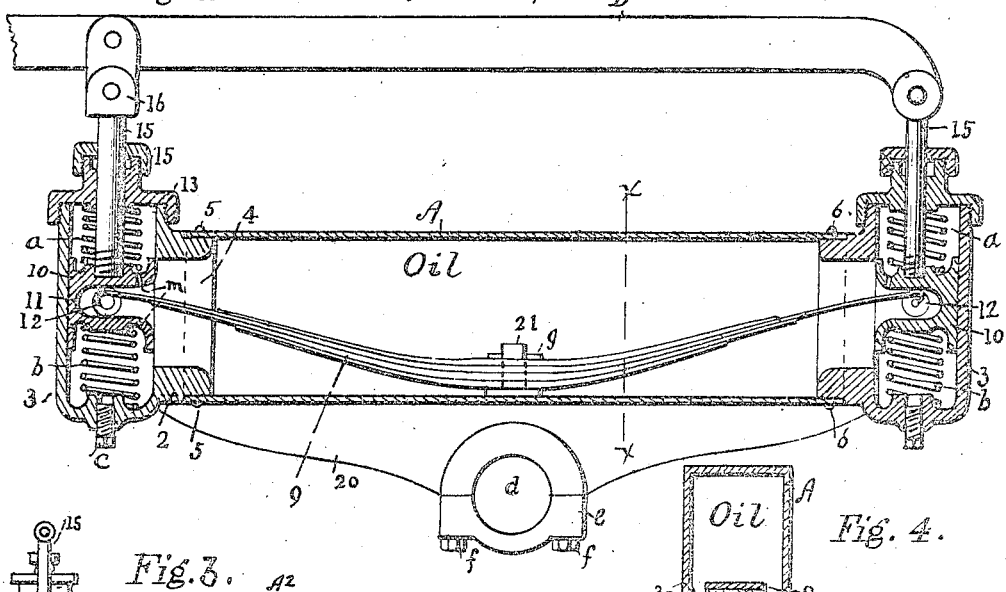
Figure 4:
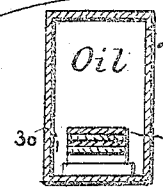
Figure 3:
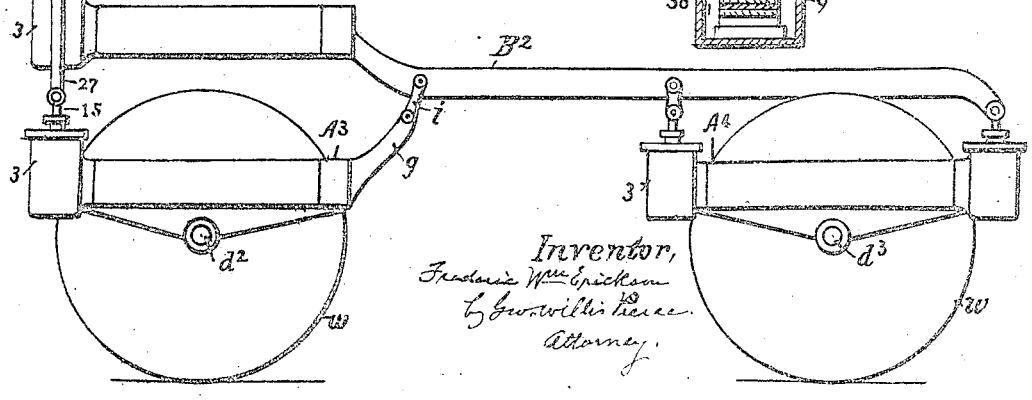

In the drawings, which form a part of and illustrate the specifications,—Figure 1 is a longitudinal section of the invention showing the parts disposed between the wheel axle and the chassis of an automobile and the connections to the same. Fig. 2 is a modification of the above; Fig. 3 is a schematic side view of a second modification; and Fig. 4 is a cross-section on line $x\ x$ of Fig. 2.

Referring to the drawings, B represents an extension of the chassis terminating in an eye 18, which connects by a link 17 with an eye 16 of the rod 15, which extends into the cylinder 3 through its gland 14 and screw cap 13, and is screwed into the upper end of a piston 10 having a cavity 11 opening to the entrance 4 in the extension 2 from the wall of the cylinder 3; spiral springs $a$ and $b$ are interposed respectively between the top of the piston and the cap 13, and between the under side of the piston and the end of the cylinder in which is located a drain plug $c$.

A is a sealed metal casing or box attached as shown in Fig. 1 to the extension 2 by screws or bolts 5, and to the end piece 7 by screws or bolts 6; a bracket 25 extends from the piece 1 outward, from which a link 19 is connected to the chassis extension B. Extending inward from the end piece 1 is a hub 7 having a central opening 8 in which are secured by pins the ends of the leaves constituting the spring 9, which are of varying lengths as commonly adapted in open spring suspension, one of which projects into the space 11 in the plunger 10 which serves as a guide to the steel roller 12 in which the spring end is set.

The casing A is filled with oil which may be inserted into the cylinder 3 by the removal of the cap 13, one or more holes $m$ being made in the ends of the piston 10 to allow the oil to circulate freely. A flange 20 extends downward from the under side of the case A and is provided centrally of its length with a clamp $e$ whose cap may engage in the space $d$ and secure by the screws $f\ f$ an axle of the automobile.

The leaves of the spring 9 are made with little clearance 30 between their outside edges and the walls of the case in order that a slow motion applied to the spring from the ground through the wheel and axle will not prevent its action, but a quick motion will be retarded until sufficient time is given for displacement of the oil from the upper to the lower section of the case, or vice versa, as the case may be, thus absorbing practically all the shocks transmitted to the spring through the suspension points. The piston is intended to slide vertically in the cylinder 3, and the vertical action is retarded only in case of quick shocks, and slow motion by pressure on the piston rod 15 will not be checked, for the piston has a number of escapement holes $m$ as stated, the size and number of which will be determined by the weight of the chassis and the load to be carried. Excess motion and added resiliency is given by the auxiliary springs *a* and *b*, and is of assistance in severe and sudden shocks.

In Fig. 2 is shown a construction similar to the foregoing, but using the common type of center supported spring inside the case A and connected at each end to a piston 10, and in practice this construction will be satisfactory for use on the forward end of the chassis.

In Fig. 3 is shown a method of spring suspension for the entire chassis on the forward and rear wheels designed, as will be readily understood, to have one or more spring cases on each end. $d^2$ is the rear axle, and $A^2$ and $A^3$ are the spring cases one over the other, the former attached to the chassis $B^2$ and the latter supported by the wheel axis $d^2$, the piston rods 15 of both cylinders 3 being connected by the link 27 to move together; and the lower case $A^3$, attached to the chassis by its bracket $g$ and link $i$. $d^3$ is the forward axle and the spring case $A^4$ is supported thereby. Case $A^4$ is identical with the case shown in section of Fig. 2. *w w* are forward and rear wheels of the vehicle. The cases are protective from dust, dirt and external injuries to the inclosed parts, and the spring being immersed in oil is constantly lubricated, a very important and desirable feature, and is made wider and much lighter and more flexible than the open springs in common use, because it does not have to be made heavy to resist the severe shocks which would otherwise obtain; and the temper of the springs is calculated nearer to the carrying load only.

I claim as my invention—

1. A device of the character described, comprising a liquid-tight casing filled with liquid, said casing having two substantially parallel walls, a flat resilient member in the casing movable in a direction parallel with said walls and narrowly spaced therefrom to provide for a restricted passage of the liquid as the said member moves relatively to said walls; and means for connecting said member and the casing to two relatively movable parts of a vehicle.

2. A device of the character described, comprising an elongated liquid-tight casing filled with liquid, said casing having substantially parallel opposing faces, a flat resilient member extending lengthwise in the casing and movable between said faces and having its edges narrowly spaced therefrom to provide restrictive passages for the liquid as the said member moves relatively to said faces, and means for connecting said member and the casing to two relatively movable parts of a vehicle.

3. In spring suspension apparatus for vehicles, a chassis, resilient means resting upon an axle of the vehicle, consisting of a sealed casing, a leaf spring within the casing secured to a wall of the same, a cylinder opening into the casing, a piston therein provided with a guide for the free end of the spring, a piston rod adapted to engage the chassis, the casing and cylinder being filled with oil.

4. In spring suspension apparatus for vehicles, a chassis, resilient means resting upon an axle of the vehicle consisting of a sealed casing, a leaf spring within the casing secured to a wall of the same, a cylinder opening into the casing, a piston therein provided with a guide for the free end of the spring, a piston rod adapted to engage the chasis, auxiliary resilient means located in said cylinder, the casing and cylinder being filled with oil.

5. In spring suspension apparatus for vehicles, running gear having a chassis, a sealed case filled with oil provided with means for resting on a wheel axle, a cylinder, a piston therein, a leaf spring secured to a wall of the case, a guide in the piston to receive the free end of the spring, a piston rod extending out of the cylinder and connected to the chassis, means for filling the cylinder with oil.

6. A device of the character described comprising a liquid-tight casing filled with liquid, a leaf spring mounted to move inside the casing and in said liquid, said spring having its edges at such distances from the inner walls of the casing as to provide constricting passages for the liquid as the spring and casing move relatively to each other, and means for connecting the spring and the casing to two relatively movable parts of a vehicle.

7. A spring suspension apparatus for vehicles consisting of two or more similar devices for regulating and modifying shocks from the wheels attached to each axle thereof, each device composed of a sealed case filled with oil, having a leaf spring bolted to a wall of the case, a cylinder opening into the case, a piston provided with a guide for the free end of the spring, a piston rod extending through the cylinder to the chassis, and auxiliary springs within the cylinder as and for the purpose set forth.

8. A device for regulating and modifying shocks from the wheels of an automobile adapted to be attached to an axle thereof, composed of a sealed case having a cylinder opening into the case, a piston provided with a guide, a leaf spring secured to an inner wall of the case, its free end terminating in a roller which plays in said guide, a piston rod extending out from one end of the cylinder and having means of attachment to a chassis.

9. A device for regulating and modifying shocks from the wheels of an automobile, adapted to be attached to an axle thereof, composed of a sealed case, oil within the same, a leaf spring secured to an inner wall of the case, its free end connected with means to convey vibration to the chassis and its outer edges having little clearance with the approximate walls of the case.

10. A device for regulating and modifying shocks from the wheels of an automobile, adapted to be attached to an axle thereof, composed of a sealed protective case, oil within the same, a leaf spring immersed in the oil, secured to an inner wall of the case, its free end connected with means to convey vibration to the chassis, and its outer edges having little clearance with the approximate walls of the case.

In testimony whereof, I have signed my name to this specification in the presence of two subscribing witnesses, this tenth day of April 1915.

FREDERIC WM. ERICKSON.

Witnesses:
 L. H. SUAREZ,
 E. A. DNELEN.